Patented May 8, 1945

2,375,250

UNITED STATES PATENT OFFICE 2,375,250

ANTIOXIDANT COMPOSITIONS

Roy W. Riemenschneider, Glenside, and Jack Turer, Philadelphia, Pa., assignors to Claude R. Wickard, as Secretary of Agriculture of the United States of America, and his successors in office No Drawing. Application March 19, 1943, Serial No. 479,686

6 Claims. (Cl. 260—398.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to antioxidant compositions and more particularly to rancidity inhibitors for fats and oils.

To inhibit oxidative rancidity, the objectionable odor and flavor imparted to fats and oils by the action of atmospheric oxygen, it is common practice to incorporate various antioxidants or rancidity-inhibiting agents with oleaginous materials.

Wells and Riemenschneider have shown in their application, Serial No. 472,280, filed January 13, 1943, now Patent No. 2,368,435, that ascorbyl monoesters of fat acids are fat-soluble substances having excellent rancidity-inhibiting properties.

We have found that synergistic antioxidant action results when ascorbyl monoesters of fat acids are used in conjunction with alpha-tocopherol (vitamin E) or its isomers or analogues.

The term "ascorbyl monoesters of fat acids," as used herein, is defined as the monoesters of saturated aliphatic monocarboxylic acids containing from 12 to 18 carbon atoms per molecule with compounds of the ascorbic acid series having the general formula:

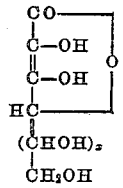

where $x$ is 0 or a whole number not exceeding 3. Thus, the term "ascorbyl monoesters of fat acids" is meant to include such compounds as lauryl, myristyl, palmityl, stearyl monoesters of d- and l-ascorbic and of d- and l-isoascorbic acids, or of other compounds of the ascorbic acid series, used either singly or in combination.

Ascorbyl monoesters of fat acids are obtainable by the interaction of aliphatic monocarboxylic acids with compounds of the ascorbic acid series in the presence of concentrated sulfuric acid, as described by Wells and Swern in their applications for patent Serial Nos. 442,557 and 442,558, filed May 11, 1942. According to the methods disclosed in these applications, the monocarboxylic acid and the compound of the ascorbic acid series are dissolved in concentrated sulfuric acid and the mixture is maintained at a suitable temperature, preferably at ordinary room temperature, for a length of time necessary to effect esterification, which usually requires 16 to 20 hours. The monoester is then isolated from the sulfuric acid solution by any suitable procedure; for instance, by dilution with water followed by solvent extraction.

The method of preparing these monoesters is further illustrated by the following examples:

Example I l-Ascorbyl palmitate, the palmitic acid monoester of l-ascorbic acid, is prepared by dissolving 8.8 grams of l-ascorbic acid and 10.3 grams of palmitic acid in 100 cc. of 95 percent sulfuric acid at essentially room temperature. The solution is allowed to stand for about 16 hours after which the reaction mixture is poured slowly and with vigorous stirring into about 500 grams of chopped ice. The stirring is continued until the oily phase of the mixture has solidified. The mixture is then extracted with ethyl ether and the ether extract is washed with water until the washings are substantially free of mineral acid. The ether extract is then dried and evaporated to dryness and the residue remaining is powdered and washed by decantation with 200 to 300 cc. of petroleum ether (boiling range 35° to 60° C.), thereby removing unreacted palmitic acid from the reaction product. The white solid residue is insoluble in petroleum ether and consists essentially of ascorbyl monopalmitate. The yield is good.

Example II 8.8 grams of d-isoascorbic acid are esterified with 10.3 grams of palmitic acid in 100 cc. of 95 percent sulfuric acid by the procedure described in Example I. The reaction product after removal of unreacted palmitic acid consists essentially of d-isoascorbyl monopalmitate. The yield is good.

The use of the antioxidant compositions of our invention results in a marked increase in the stability of fatty materials against oxidative rancidity. This increase in stability is much greater than the additive effect of either substance used singly.

Our invention is illustrated by the following tabulation of experimental data:

| Substrate | Rancidity-inhibiting agents added | | | Stability, hours |
|---|---|---|---|---|
| | Alpha-tocopherol, percent | Ascorbyl monoester | | |
| | | Monoester used | Amount used, percent | |
| Drip rendered lard. | | | | ? |
| Do | 0.01 | | | 8 |
| Do | | d-Isoascorbyl palmitate. | 0.12 | 3 |
| Do | 0.01 | ...do... | 0.12 | 26 |
| Do | 0.02 | ...do... | 0.12 | 17 |
| Do | | ...do... | 0.05 | 2½ |
| Do | 0.02 | ...do... | 0.05 | 32 |
| Do | 0.02 | ...do... | 0.12 | 35½ |
| Do | | l-Ascorbyl palmitate | 0.05 | 2½ |
| Do | 0.02 | ...do... | 0.05 | 32 |
| Do | 0.02 | d-Isoascorbyl laurate | 0.05 | 30½ |
| Do | 0.02 | d-Isoascorbyl myristate. | 0.05 | 30½ |
| Do | 0.02 | d-Isoascorbyl stearate. | 0.05 | 30 |
| Do | 0.02 | l-Ascorbyl stearate. | 0.05 | 30 |

In the above table, the stability of the tested materials is indicated by the length of time required to attain a peroxide content equal to 20 milli-equivalents per kilogram of the fatty substrate. The stability is determined by the well known Swift stability test, also known as the "Active oxygen method," in which air is bubbled at a uniform and predetermined rate through samples of the fatty material maintained at 100° C. At regular intervals the samples are tested for peroxide content by determining the amount of free iodine liberated from potassium iodide by the peroxide-like oxidation products found in the fatty material.

Our invention is not limited to the specific examples listed in the above table, but is applicable to any oleaginous material of the glyceride type or other esters of fat acids. Also, any ascorbyl monoester of fat acids may be used in combination with alpha-tocopherol or its isomers and analogues.

Having thus described our invention, we claim:

1. An antioxidant composition comprising an ascorbyl monoester of a saturated aliphatic monocarboxylic acid containing from 12 to 18 carbon atoms per molecule, and a compound selected from the group consisting of alpha-tocopherol and the isomers and analogues of alpha-tocopherol.

2. An antioxidant composition comprising d-isoascorbyl monopalmitate, and alpha-tocopherol.

3. An antioxidant composition comprising l-ascorbyl monopalmitate, and alpha-tocopherol.

4. An antioxidant composition comprising l-ascorbyl monostearate, and alpha-tocopherol.

5. The method of inhibiting animal and vegetable fats and oils and other esters of fat acids against oxidative rancidity which comprises incorporating therewith an ascorbyl monoester of a saturated aliphatic monocarboxylic acid containing 12 to 18 carbon atoms per molecule, and a compound selected from the group consisting of alpha-tocopherol and the isomers and analogues of alpha-tocopherol.

6. An oleaginous composition comprising esters of fat acids, having incorporated therein in an amount sufficient to inhibit the development of oxidative rancidity an ascorbyl monoester of a saturated aliphatic monocarboxylic acid containing 12 to 18 carbon atoms per molecule, and a compound selected from the group consisting of alpha-tocopherol and the isomers and analogues of alpha-tocopherol.

ROY W. RIEMENSCHNEIDER.
JACK TURER.